(12) United States Patent
Morris

(10) Patent No.: US 8,360,391 B2
(45) Date of Patent: Jan. 29, 2013

(54) METAL SEALING, STEM LOCKING MECHANISM

(75) Inventor: Bruce E. Morris, Houston, TX (US)

(73) Assignee: Quality Connector Systems, Houston, TX (US)

( * ) Notice: Subject to any disclaimer, the term of this patent is extended or adjusted under 35 U.S.C. 154(b) by 957 days.

(21) Appl. No.: 12/044,705

(22) Filed: Mar. 7, 2008

(65) Prior Publication Data

US 2009/0224189 A1    Sep. 10, 2009

(51) Int. Cl.
*F16K 35/00* (2006.01)

(52) U.S. Cl. ............ 251/93; 251/89; 251/111; 251/113; 251/248; 403/310; 403/311

(58) Field of Classification Search .................. 251/95, 251/96, 89, 93, 102, 111, 113, 248, 250.5, 251/214, 58; 403/1, 310, 311, 312; 73/813, 73/548

See application file for complete search history.

(56) References Cited

U.S. PATENT DOCUMENTS

| | | | |
|---|---|---|---|
| 797,547 A * | 8/1905 | Bachelder | 251/149 |
| 1,753,989 A | 4/1930 | Wilhelm | |
| 1,767,658 A | 6/1930 | Fantz | |
| 2,587,934 A * | 3/1952 | Volpin | 116/277 |
| 3,139,932 A | 7/1964 | Johnson | |
| 3,186,014 A | 6/1965 | Herbert | |
| 3,545,489 A | 12/1970 | Brown et al. | |
| 3,664,376 A | 5/1972 | Watkins | |
| 3,674,123 A | 7/1972 | Lewis et al. | |
| 3,955,793 A * | 5/1976 | Burkhardt et al. | 251/95 |
| 4,224,986 A | 9/1980 | Rothberg | |
| 4,230,299 A * | 10/1980 | Pierce, Jr. | 251/14 |
| 4,291,724 A | 9/1981 | Miller | |
| 4,372,337 A | 2/1983 | Holzenberger | |
| 4,411,459 A | 10/1983 | Ver Nooy | |
| 4,650,151 A * | 3/1987 | McIntyre | 251/14 |
| H252 H * | 4/1987 | Sturman | 141/392 |
| 4,821,772 A | 4/1989 | Anderson et al. | |
| 4,865,078 A * | 9/1989 | Ensign | 137/636.1 |
| 4,964,612 A | 10/1990 | Maggioni et al. | |
| 4,971,307 A | 11/1990 | Killerud et al. | |
| 5,076,308 A * | 12/1991 | Cohen | 137/1 |

(Continued)

OTHER PUBLICATIONS

U.S. Patent and Trademark Office, "Office Communication," for U.S. Appl. No. 11/796,122 mailed May 11, 2010.

(Continued)

*Primary Examiner* — John Rivell
*Assistant Examiner* — Matthew W Jellett
(74) *Attorney, Agent, or Firm* — Meyertons, Hood, Kivlin, Kowert & Goetzel, P.C.; Eric B. Meyertons

(57) ABSTRACT

A device includes a stem hub attached to a fitting body. A rotatable stem is located at least partially within the stem hub. Rotation of the rotatable stem operates a blocking element located in the fitting body. In an embodiment, an upper stem is coupled to a first end portion of the rotatable stem so that rotation of the upper stem rotates the rotatable stem. A metal seal is located on the stem hub. A portion of the upper stem presses the metal seal between the upper stem and the stem hub when the upper stem is moved towards the stem hub. An operating mechanism moves the upper stem towards the stem hub and away from the stem hub. The upper stem is moved by the operating mechanism in a direction normal to the rotational axis of the rotatable stem and the upper stem.

22 Claims, 9 Drawing Sheets

U.S. PATENT DOCUMENTS

| | | | |
|---|---|---|---|
| 5,076,319 A | 12/1991 | Salley | |
| 5,082,391 A * | 1/1992 | Florida | 403/342 |
| 5,215,112 A * | 6/1993 | Davison | 137/385 |
| 5,307,838 A | 5/1994 | d'Agostino et al. | |
| 5,490,660 A * | 2/1996 | Kamezawa | 251/96 |
| 5,842,816 A | 12/1998 | Cunningham | |
| 5,857,715 A | 1/1999 | Gray et al. | |
| 5,893,392 A | 4/1999 | Spies et al. | |
| 6,142,708 A | 11/2000 | Tarlton et al. | |
| 6,164,188 A * | 12/2000 | Miser | 92/84 |
| 6,260,819 B1 * | 7/2001 | Ovsepyan | 251/96 |
| 6,276,662 B1 * | 8/2001 | Bugatti | 251/95 |
| 6,283,152 B1 * | 9/2001 | Corte et al. | 137/614.11 |
| 6,290,207 B1 * | 9/2001 | Genga et al. | 251/174 |
| 6,311,727 B1 | 11/2001 | Campau | |
| 6,340,148 B1 * | 1/2002 | Sung | 251/96 |
| 6,578,881 B2 * | 6/2003 | Lynn et al. | 285/354 |
| 6,851,478 B2 | 2/2005 | Cornelssen et al. | |
| 6,886,805 B2 * | 5/2005 | McCarty | 251/214 |
| 6,935,615 B2 * | 8/2005 | McCarty | 251/214 |
| 2003/0020034 A1 * | 1/2003 | Newport et al. | 251/58 |
| 2004/0149951 A1 * | 8/2004 | Gethmann | 251/291 |
| 2008/0263796 A1 | 10/2008 | Morris et al. | |
| 2008/0265567 A1 | 10/2008 | Morris | |

OTHER PUBLICATIONS

BKW Inc. Pig Switches web product page (www.bkwinc.com/pigging.html), date unknown; 3 pages.

OII States Hydrotech Piggable Y Fittings web product page (www.oilstateshydrotech.com), date unkown; 1 page.

"All About Pigging" from Pipeline Design for Pigging article, date unknown; 1 page.

U.S. Patent and Trademark Office, "Office Communications" for U.S. Appl. No. 11/857,971 mailed Jan. 7, 2011 and May 11, 2011.

U.S. Patent and Trademark Office, "Office Communications" for U.S. Appl. No. 11/857,972 mailed Jan. 7, 2011 and May 11, 2011.

* cited by examiner

METAL SEALING, STEM LOCKING MECHANISM

BACKGROUND

1. Field of the Invention

The present invention relates to valves and operating mechanisms for operating the valves. Some embodiments relate to a device for providing pressure containment operation of the valve.

2. Description of Related Art

Valves are used extensively in many piping systems such as, but not limited to, transmission pipelines, subsea pipelines, process piping, refineries, and power generation systems. For example, valves may be used with fittings such as the wye fittings disclosed in U.S. patent application Ser. No. 11/796,122 entitled "Reverse Flow Wye Connector" and U.S. patent application Ser. No. 11/857,972 entitled "Pipeline Systems Using A Reverse Flow Wye Connector", which are incorporated by reference as if fully set forth herein.

A majority of valves include an actuator stem that extends from the blocking element (e.g., a ball, clapper, diverter, gate, or plunger) in the pressurized (e.g., product pressurized) internal cavity to the outside environment. The actuator stem may be sealed by a variety of methods including braid and impregnated packing, elastomer seals, polymer seals, and other types of seals in various shapes and forms. Shapes and forms include, but are not limited to, chevron, o-ring, and lip shapes. The seals contain internal product and pressure by bridging the gap between the valve body and the stem while allowing the stem to rotate relative to the body to actuate the blocking element.

Metal-type seals may be preferred for stem sealing but dynamic (e.g., rotating) metal seals are temperamental and require fine surface finishes and contaminant free environments to operate properly. Over prolonged use and/or over protracted static periods, elastomeric or polymeric valve seals may begin to leak because of deterioration due to product exposure or loss of elastomeric or polymeric properties. Leaking product may create environmental issues, health issues, and/or hazardous conditions in certain systems (e.g., pipeline systems).

In some cases, locking of the stem against inadvertent rotation is desirable to inhibit full or partial closure of the blocking element in certain situations. For example, the stem may be locked to inhibit accidental closure of the blocking element while product is flowing through the valve. Also, for safety, the stem may be locked to prevent accidental opening of the blocking element while personnel are working elsewhere on the piping system.

To solve or avoid some of the problems associated with dynamic metal seals and elastomeric or polymeric seals, a metal-sealed, locking, cap-type device is proposed. The device provides long term pressure containment to seal the stem during static periods when stem rotation is not required. The device also provides locking of the stem against inadvertent rotation.

SUMMARY

In certain embodiments, a device includes a stem hub attached to a valve body. A rotatable stem may be located at least partially within the stem hub. The rotatable stem may rotate within the stem hub. Rotation of the rotatable stem may operate a blocking element in the valve body.

An upper stem may be coupled to a first end portion of the rotatable stem so that rotation of the upper stem rotates the rotatable stem. The upper stem may be at least somewhat moveable in a direction normal to the rotational axis of the rotatable stem and the upper stem. A metal seal may be located on the stem hub. A portion of the upper stem may press the metal seal between the upper stem and the stem hub when the upper stem is moved to a locked position. The upper stem may be inhibited from rotating or moving when in the locked position.

An operating mechanism may move the upper stem between the locked position and an unlocked position. The operating mechanism may include a clamp or ring that moves to press the upper stem against the stem hub into the locked position. The upper stem may be moved by the operating mechanism in the direction normal to the rotational axis of the rotatable stem and the upper stem. The metal seal may seal the first end portion of the rotatable stem inside the upper stem and the stem hub when the upper stem is in the locked position.

In some embodiments, one or more rotating seals are located in the stem hub and surround the rotatable stem. One or more rotating seals may be located in the valve body and surround the second end portion of the rotatable stem.

In some embodiments, the upper stem and/or the operating mechanism of a valve are actuated using a remotely operated vehicle (ROV), a hydraulic or pneumatic actuator, or human operator. The device may be used in subsea applications.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

Figure 1:
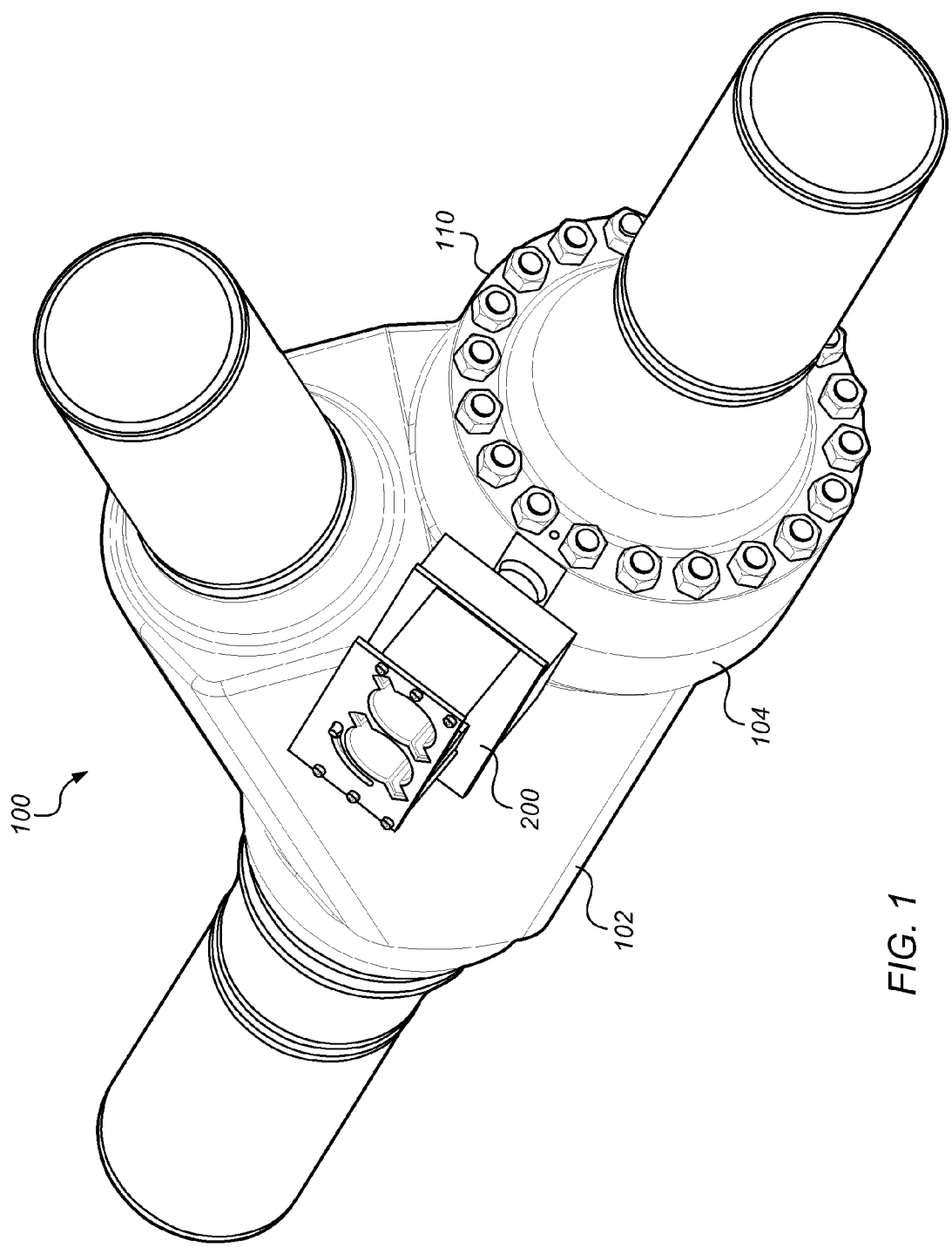
FIG. 1 depicts a perspective representation of an embodiment of a device coupled to a fitting.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

In the context of this patent, the term "fitting" means a fitting or connector that may be coupled into a pipeline (e.g., a subsea pipeline, slurry pipeline, or solid transport pipeline). Fittings may include, but not be limited to, valves, diverters, wye-shaped fittings, piggable fittings, and measurement devices. The term "coupled" means either a direct connection or an indirect connection (e.g., one or more intervening connections) between one or more objects or components. The phrase "directly connected" means a direct connection between objects or components such that the objects or components are connected directly to each other so that the objects or components operate in a "point of use" manner.

Figure 2:
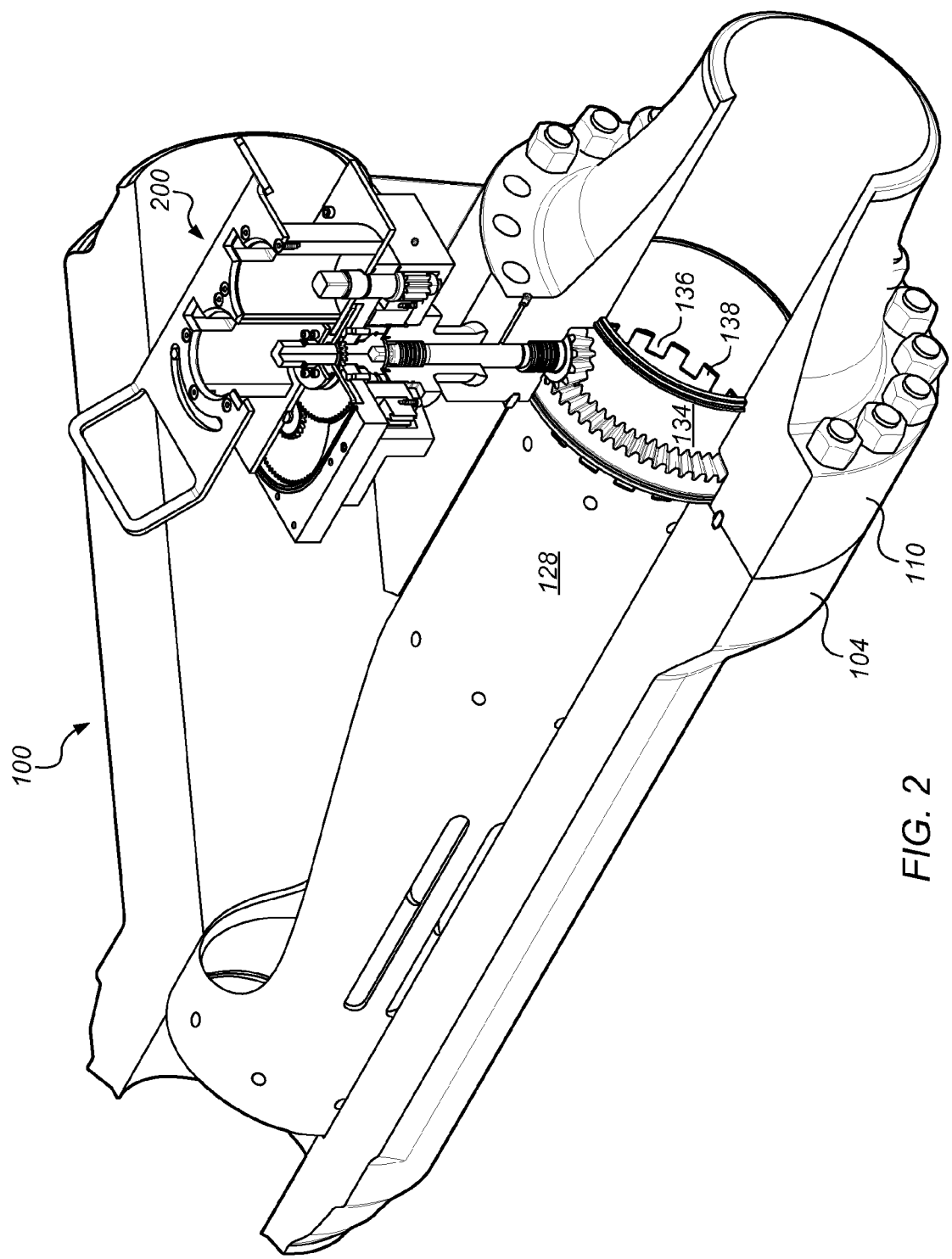
FIG. 2 depicts a perspective representation of an embodiment of a device coupled to a fitting with a portion of the device and fitting cut-out to show the interior of the device and fitting.
Figure 3:
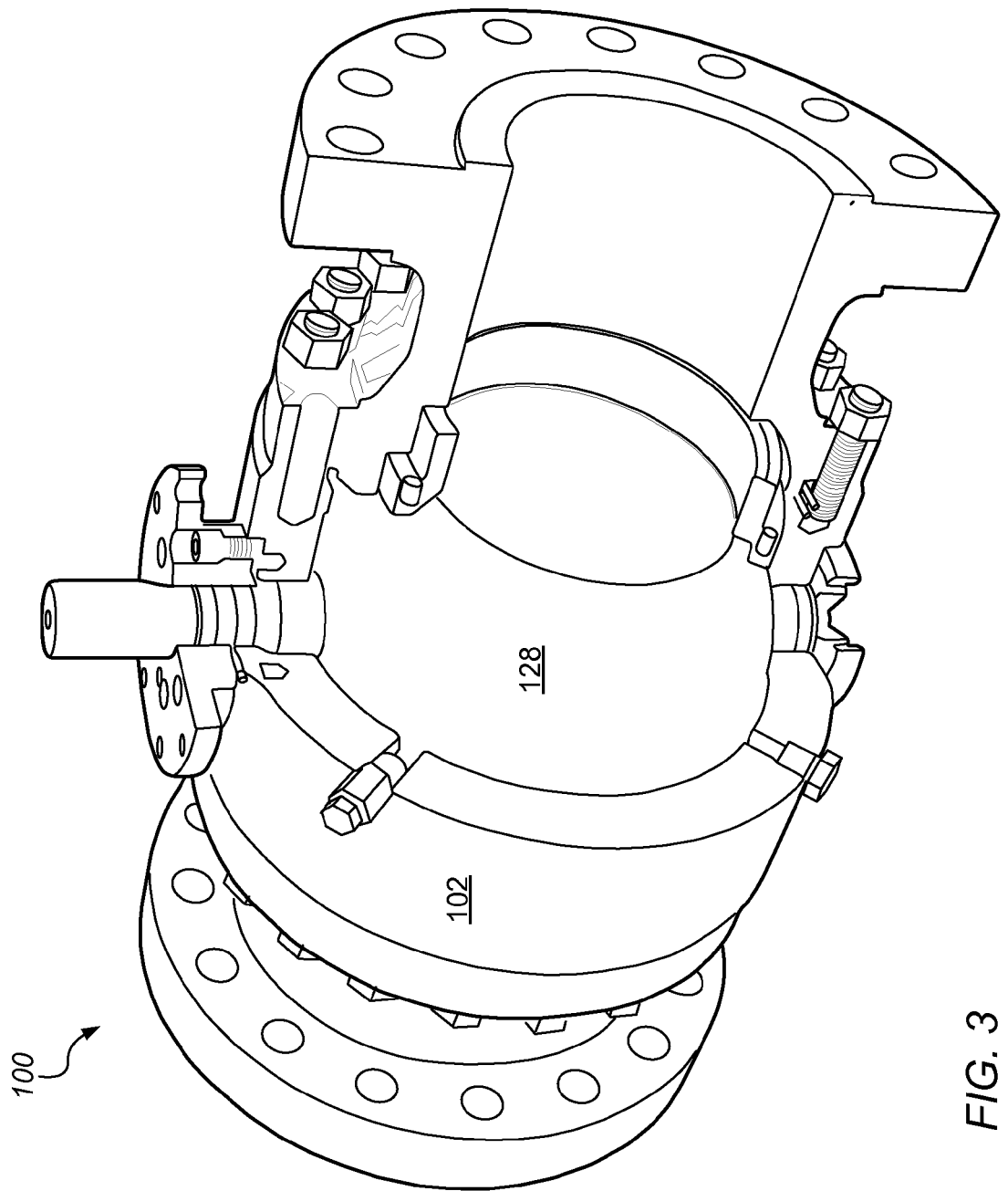
FIG. 3 depicts a perspective representation of an embodiment of a valve with a portion of the valve cut-out to show the interior of the valve.
Figure 4:
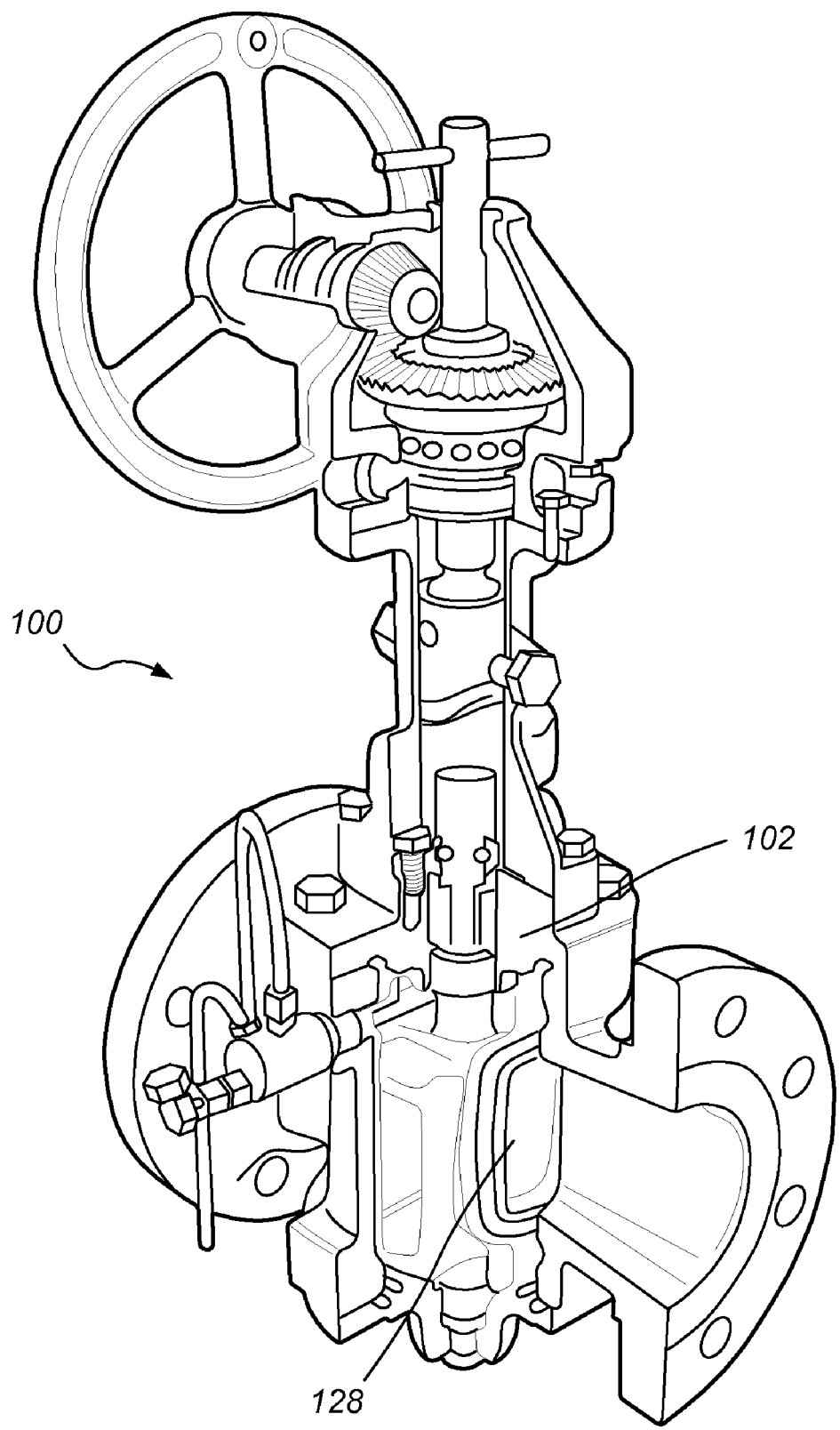
FIG. 4 depicts a perspective representation of an embodiment of a valve with a portion of the valve cut-out to show the interior of the valve.

FIG. 1 depicts a perspective representation of an embodiment of device 200 coupled to fitting 100. FIG. 2 depicts a perspective representation of an embodiment of device 200 coupled to fitting 100 with a portion of the device and fitting cut-out to show the interior of the device and fitting. Fitting 100 may be a valve or any other device that operates with a stem. In certain embodiments, fitting 100 is a wye-shaped fitting such as described in U.S. patent application Ser. No. 11/796,122 and U.S. patent application Ser. No. 11/857,972. In this patent, the description of device 200 in association with fitting 100 is provided as an example of one possible embodiment for implementation of device 200. It is to be understood that other possible embodiments for implementation of device 200 may be contemplated without deviating from the scope of the claims in this patent. For example, the device may be used with valves 100 depicted in FIG. 3 and FIG. 4.

In certain embodiments, fitting 100 includes body 102 and blocking element 128. Fitting 100 and body 102 may be operable in high pressure conditions due to the pressurized contained product in the pipeline or ambient pressure from deep subsea conditions. For example, fitting 100 and body 102 may be configured to meet selected ASME (American Society of Mechanical Engineers) standards, ANSI (American National Standards Institute) ratings, ASTM (American Society for Testing and Materials) standards, and/or DNV (Det Norske Veritas) standards.

As shown in FIG. 2, fitting 100 may include flange 110 coupled to port 104 on body 102. Blocking element 128 may be a diverter of fitting 100. Blocking element 128 may be a conduit (e.g., a sleeve or tubular) located inside body 102 that rotates between an open position and a closed position. In the open position, blocking element 128 allows fluids and/or objects to pass between selected passages in fitting 100. In the closed position, blocking element 128 inhibits fluids and/or objects from passing between selected passages in fitting 100.

Blocking element 128 may be moved (e.g., rotated) using a drive mechanism. The drive mechanism may include drive hub 134. Drive hub 134 may be located inside body 102 and coupled to, and/or contained by, flange 110. In certain embodiments, drive hub 134 includes teeth 136 that engage with teeth 138 on blocking element 128. Teeth 136 may be formed as part of drive hub 134 or attached to drive hub 134 as a separate component (e.g., a ring gear that is attached to the drive hub by, for example, bolting, welding, or other attachment means). In some embodiments, teeth 136 and/or teeth 138 are castellations. When drive hub 134 is operated, teeth 136 engage with teeth 138 to move (e.g., rotate) blocking element 128 between the open and closed positions.

Figure 5:
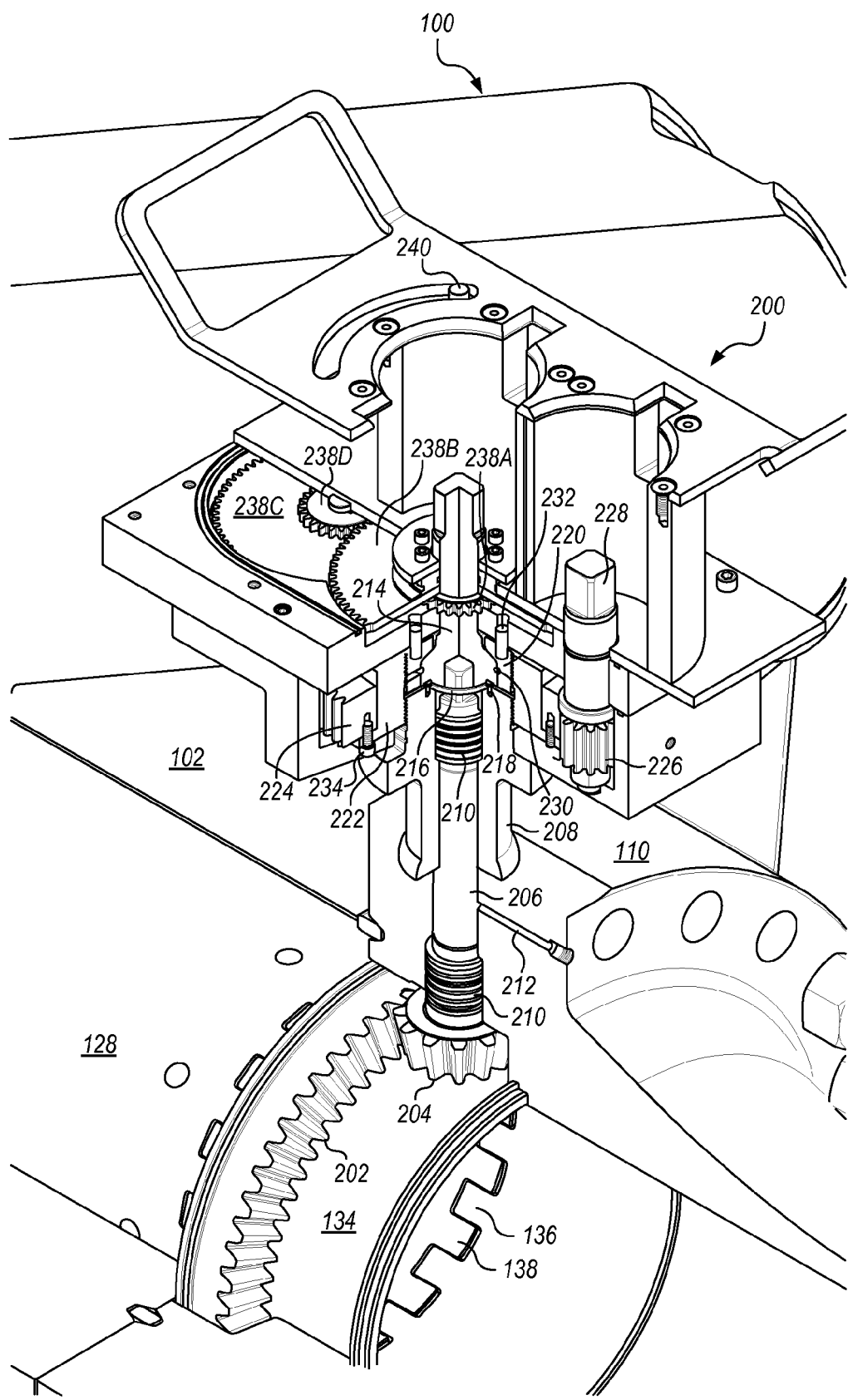
FIG. 5 depicts an enlarged view of a portion of the device and fitting shown in FIG. 2.
Figure 6:
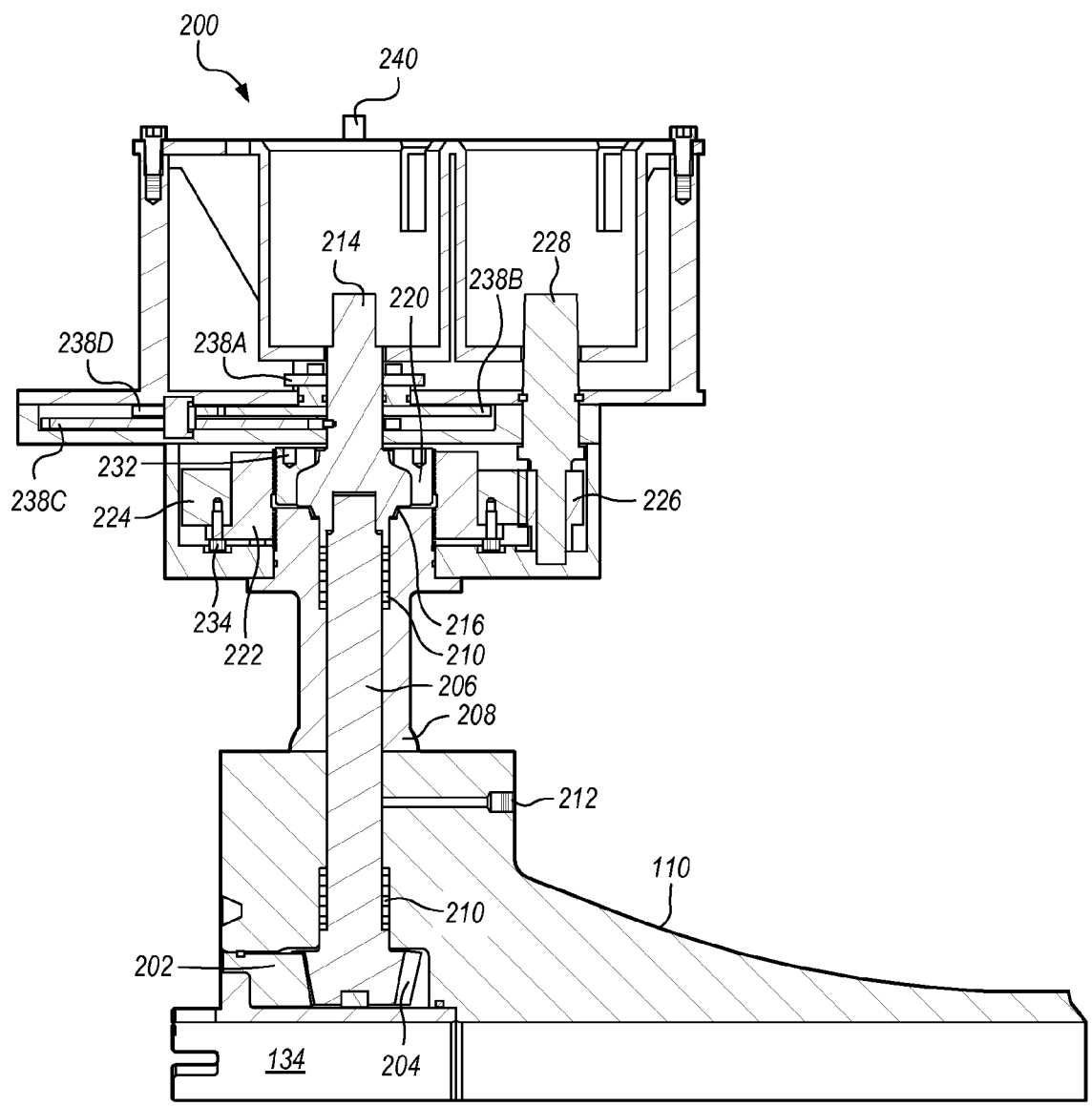
FIG. 6 depicts a cross-sectional view of a device coupled to a portion of a flange.

In certain embodiments, blocking element 128 and drive hub 134 are coupled to device 200. Device 200 may be used to control the operation (e.g., the rotation and orientation) of blocking element 128. FIG. 5 depicts an enlarged view of a portion of device 200 and fitting 100 shown in FIG. 2. FIG. 6 depicts a cross-sectional view of device 200 coupled to a portion of flange 110. As shown in FIGS. 5 and 6, in certain embodiments, teeth 202 on drive hub 134 engage teeth 204 on rotatable stem 206 of device 200 to couple the drive hub to the device. Teeth 202 and teeth 204 operate as a gear system to couple rotatable stem 206 to drive hub 134. Rotation of rotatable stem 206 rotates drive hub 134 (and blocking element 128) because of the engagement of teeth 202 and teeth 204. Thus, device 200 may be operated to change the position of blocking element 128 in fitting 100. Device 200 may translate and/or rotate blocking element 128.

In certain embodiments, device 200 includes stem hub 208. Stem hub 208 may be attached to flange 110 or body 102 of fitting 100. For example, stem hub 208 may be welded to flange 110. In some embodiments, stem hub 208 is otherwise attached to flange 110 as is known in the art (e.g., using bolts and metal seals). Rotatable stem 206 is located at least partially within stem hub 208. An end portion of rotatable stem 206 extends from device 200. The end portion of rotatable stem 206 may be coupled to drive hub 134. Rotating seals 210 may surround rotatable stem inside stem hub 208 and inside flange 110. Rotating seals 210 inside flange 110 inhibit fluid from flowing into or out of the flange along rotatable stem 206. Rotating seals 210 inside stem hub 208 inhibit fluid from flowing into or out of device 200. In some embodiments, rotating seals 210 include two or more rotating seals made from different types of materials. Port 212 may be a pressure release port to inhibit pressure buildup along rotatable stem 206 between rotating seals 210.

Upper stem 214 is coupled to an end portion of rotatable stem 206. Upper stem 214 and rotatable stem 206 are coupled so that rotation of the upper stem rotates the rotatable stem (e.g., the coupling is a torque transmitting coupling). In certain embodiments, the end portion of rotatable stem 206 is coupled to upper stem 214 using a square coupling. For example, as shown in FIGS. 5 and 6, the end portion of rotatable stem 206 is a male square fitting that fits into a female square fitting on upper stem 214. Other possible couplings include, but are not limited to, hex couplings, spline profiles, or gear-type profiles. The coupling of upper stem 214 and rotatable stem 206 allows the upper stem to be at least somewhat moveable in a direction normal to the rotational axis of the rotatable stem and the upper stem.

Metal seal 216 is located at the coupling between stem hub 208 and upper stem 214, which may be at or near the coupling of the upper stem and rotatable stem 206. Metal seal 216 may be located in a groove or recess cavity formed in stem hub 208. Upper stem 214 may have a seal surface to accept or mate to metal seal 216. Metal seal 216 may be, for example, a Taper-Lok® wedge seal or other metal-to-metal seal such as solid metal o-rings. Pins 218 (depicted in FIG. 5) may hold metal seal 216 in place on stem hub 208 and inhibit the metal seal from being backed out of the recess on the stem hub.

To place device 200 in a locked position, upper stem 214 is moved towards stem hub 208 so that metal seal 216 is pressed between the upper stem and the stem hub to create a metal to metal seal. In the locked position, the end portion of rotatable stem 206 is sealed inside upper stem 214 and stem hub 208. Using a metal to metal seal provides a substantially leak free seal that provides long term pressure containment and has a prolonged lifetime as compared to nonmetal seals (such as nonmetal o-rings or rotating seals).

Upper stem 214 is moved into the locked position by moving the upper stem towards stem hub 208 in the direction normal to the rotational axis of rotatable stem 206. Upper stem 214 is in the locked position when the upper stem engages metal seal 216 and stem hub 208. In some embodiments, frictional contact between upper stem 214, metal seal 216 and stem hub 208 inhibits rotation of upper stem and rotatable stem 206. In some embodiments, a protrusion of upper stem 214 engages a recess in stem hub 208 to inhibit rotation of upper stem and rotatable stem 206. In some embodiments, a protrusion of stem hub 208 engages a recess in upper stem to inhibit rotation of upper stem and rotatable stem 206. In the locked position, upper stem 214 is inhibited from being rotated or moved. Thus, rotatable stem 206 is inhibited from being rotated or moved and operation (opening or closing) of the fitting coupled to device 200 is inhibited.

Inadvertent rotation such as drifting of the blocking element in the fitting, which may be caused by fluid flowing through the fitting, is inhibited in the locked position. Inhibiting inadvertent rotation of upper stem 214 and rotatable stem 206 may be desirable to prevent inadvertent full or partial closure of a fitting (e.g., a valve) coupled to device 200. Inhibiting inadvertent rotation of upper stem 214 and rotatable stem 206 may be desirable to prevent inadvertent opening of a fitting (e.g., a valve) coupled to device 200.

Upper stem 214 is moved into an unlocked position by moving the upper stem away from stem hub 208 in the direction normal to the rotational axis of rotatable stem 206 and the upper stem. In the unlocked position, upper stem 214 is allowed to rotate and operate the valve coupled to the device through rotatable stem 206. In the unlocked position, metal seal 216 is not engaged between upper stem 214 and stem hub 208. Rotating seals 210 provide pressure containment when upper stem 214 is in the unlocked position.

In certain embodiments, upper stem 214 is moved between the locked and unlocked positions using an operating mechanism. The operating mechanism moves upper stem 214 in the direction parallel to the rotational axis of rotatable stem 206 and the upper stem. One embodiment of the operating mechanism is depicted in FIGS. 5 and 6. In this embodiment, the operating mechanism includes clamp ring 220, outboard ring 222, outboard gear 224, spur gear 226, and actuator 228. Clamp ring 220, outboard ring 222, outboard gear 224, and spur gear 226 may be part of a gear system that moves upper stem 214 towards or away from stem hub 208.

Clamp ring 220 may be shaped so that movement of the clamp ring up and down moves upper stem 214 up and down (up and down being movement in the direction parallel to the rotational axis of rotatable stem 206 and the upper stem). For example, upper stem 214 may have an upset, radially-protruding flange and clamp ring 220 may have a matching shape that allows engagement with the upper stem such that movement of the clamp ring down moves the upper stem down while the clamp ring is also allowed to rotate freely around the upper stem.

Bearings 230 (depicted in FIG. 5) may be located between clamp ring 220 and upper stem 214. Bearings 230 may sit in recesses in clamp ring 220 and/or upper stem 214. Bearings 230 allow upper stem 214 to rotate relative to clamp ring 220 while inhibiting the upper stem from moving up and down relative to the clamp ring. Thus, bearings 230 force upper stem 214 to move up and down with clamp ring 220 while allowing the upper stem to rotate freely inside the clamp ring. Bearings 230 may be, for example, ball bearings or other objects that inhibit the upper stem from moving up and down relative to the clamp ring.

Pins 232 are alignment pins that align clamp ring 220 to upper stem 214 and inhibit the clamp ring from rotating. Clamp ring 220 has teeth on its outboard edge that engage teeth on the inboard edge of outboard ring 222. The engagement of the teeth on clamp ring 220 and outboard ring 222 are designed so that rotation of the outboard ring moves clamp ring 220 up and down. Outboard ring 222 is coupled to outboard gear 224 with fasteners 234. Fasteners 234 may be, for example, screws, bolts, or other fasteners known in the art. Outboard ring 222 is coupled to outboard gear 224 so that the outboard ring rotates in conjunction with the outboard gear.

Rotation of actuator 228 rotates spur gear 226. Rotation of spur gear 226 causes outboard gear 224 and outboard ring 222 to rotate around upper stem 214 and clamp ring 220. Because of the arrangement of the teeth on clamp ring 220 and outboard ring 222, rotation the outboard ring moves the clamp ring either up or down depending on the rotation direction (e.g., clockwise may move the clamp up ring while counterclockwise moves the clamp ring down). Movement of clamp 220 ring downwards pushes upper stem 214 towards stem hub 208 and into the locked position when metal seal 216 is pressed between the upper stem and the stem hub. Movement of clamp 220 ring upwards moves upper stem 214 upwards and away from stem hub 208 and metal seal 216 into the unlocked position.

In some embodiments, the operating mechanism is coupled to an indicator that indicates if upper stem 214 is in the locked position or the unlocked position. For example, a gear system may couple the indicator to the operating mechanism so that rotation of the actuator automatically indicates the position of the upper stem.

In some embodiments, device 200 includes an indicator that indicates if the valve coupled to the device is open or closed. For example, as shown in FIGS. 5 and 6, upper stem 214 may be coupled to one or more indicator gears 238A, 238B, 238C, 238D that operate to move indicator 240. Indicator 240 may be calibrated with upper stem 214 and fitting 100 so that the indicator indicates, for example, open and closed positions of the fitting (e.g., the valve) or any other desired positions of the fitting.

In certain embodiments, the operating mechanism and/or other components of device 200 (e.g., the indicator gears) are sealed inside one or more pressure containment chambers. O-rings or other sealing elements may be used to seal the chambers containing the components of the operating mechanism and/or other components of device 200. Sealing the components of the operating mechanism and/or other components of device 200 inside pressure containment chambers may protect the components from harsh environmental conditions (e.g., subsea conditions) or other conditions that may reduce the lifetime of the components.

In certain embodiments, upper stem 214 and/or actuator 228 of the operating mechanism are operable using a remotely operated vehicle (ROV), a hydraulic or pneumatic actuator, other robotic devices, or a human operator. Upper stem 214 and/or actuator 228 may be operated using mechanically, hydraulically, pneumatically, or electrically-energized torquing tools. In some embodiments, device 200 includes other components that allow easier access for operation, movement indication, or torque reaction. For example, device 200 may include torque buckets to allow for better torque reaction to operate upper stem 214 and/or actuator 228.

Figure 7:
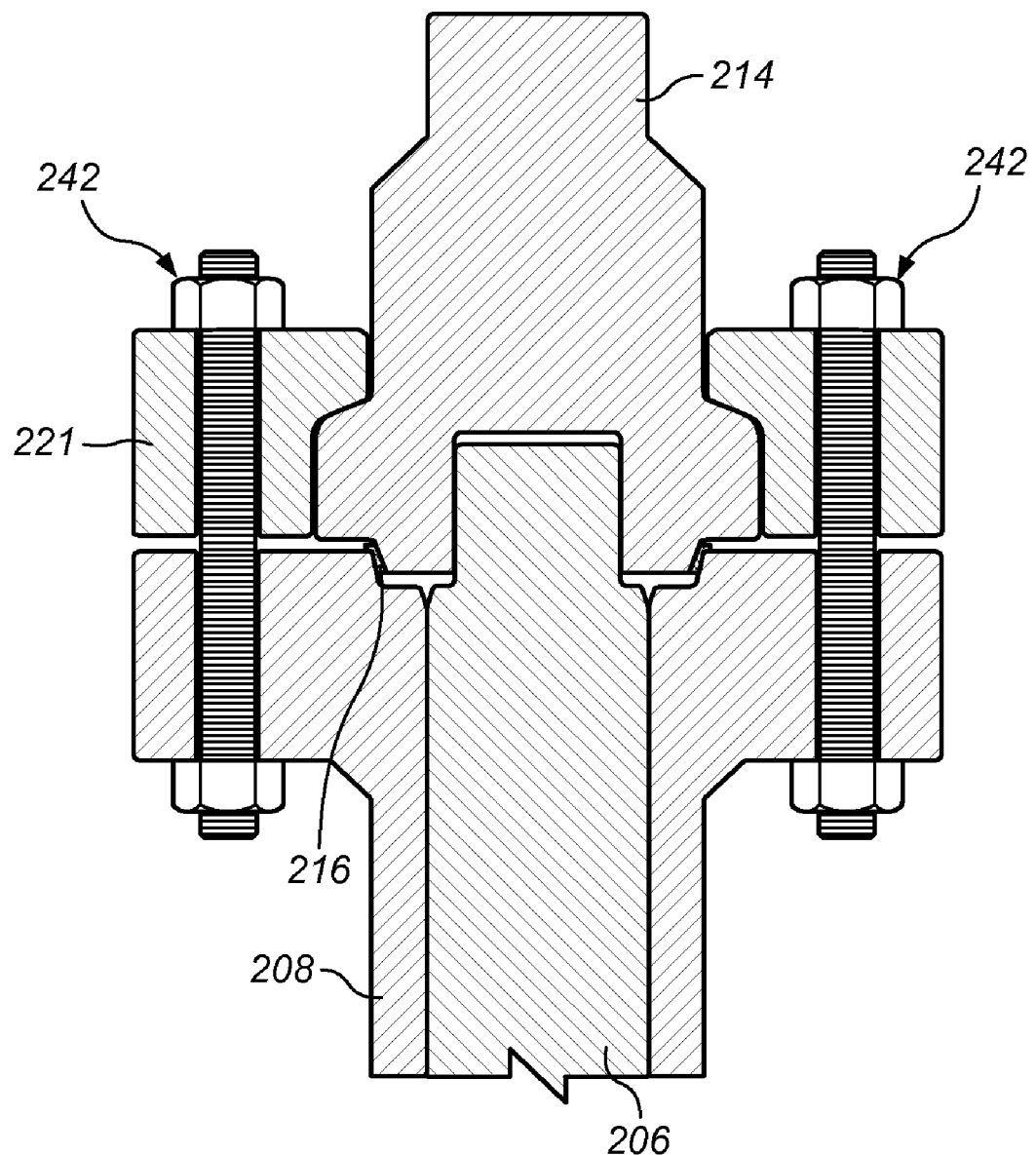
FIG. 7 depicts a cross-sectional view of an operating mechanism for locking or unlocking the device.

FIG. 7 depicts an embodiment of upper stem 214, rotatable stem 206, and stem hub 208 with an operating mechanism for moving the upper stem 214 into the locked or unlocked position. Clamp 221 may be secured and pressed down against upper stem 214 using fasteners 242 so that the upper stem presses against metal seal 216 and inhibits rotation of the upper stem. Fasteners 242 may be, for example, bolts, screws, or other fasteners known in the art. Clamp 221 may be, for example, a common hub clamp that uses tangentially-oriented bolts similar in profile to Grayloc® hubs manufactured by Gray Tool Company (Houston, TX) or API 6A hub clamps. Clamp 221 may be manually operated by loosening or tightening fasteners 242 as needed to lock or unlock upper stem 214. Clamp 221 may also be operated by a cam-type ring or other similar load-exerting mechanism.

Figure 8:
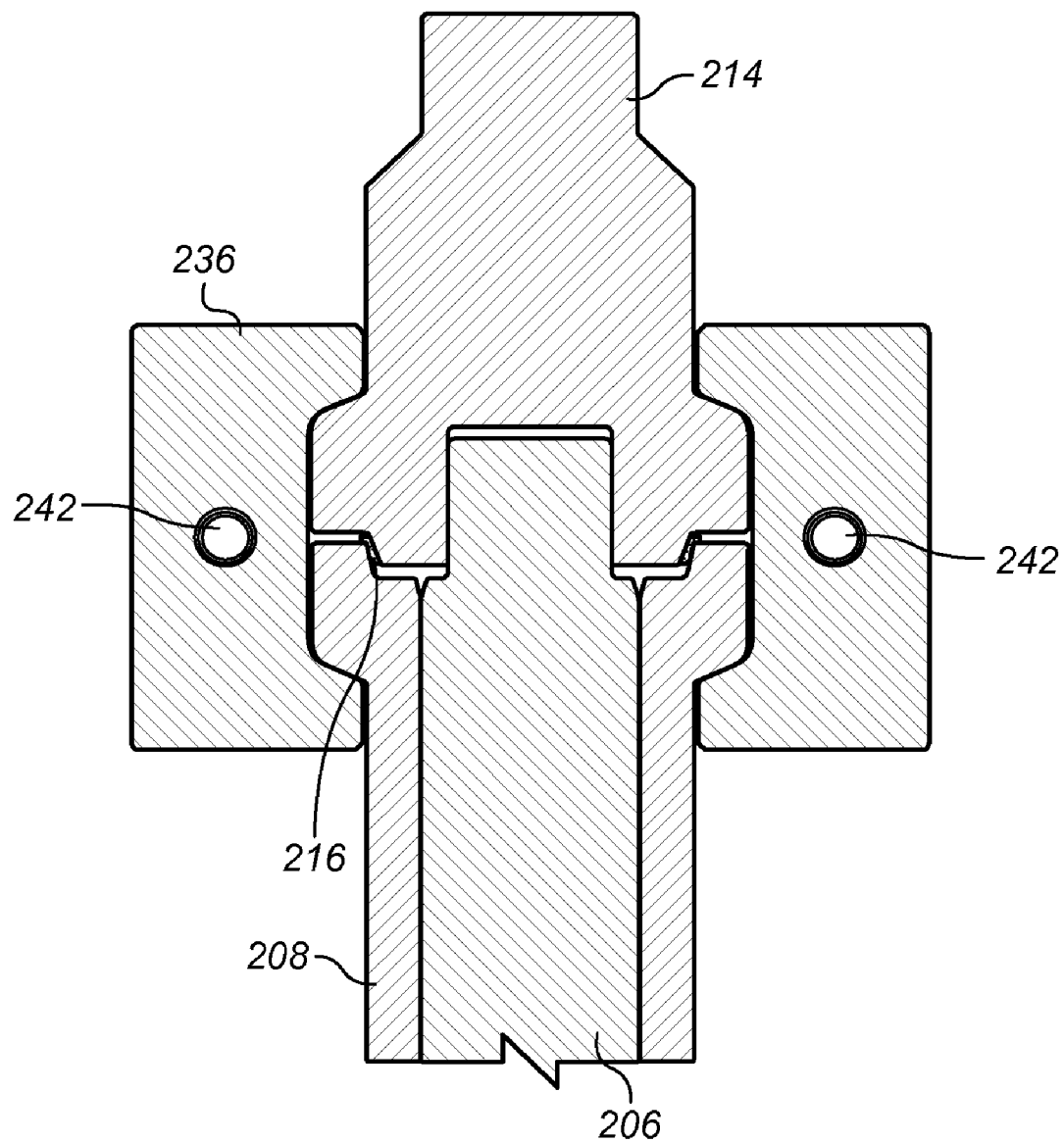
FIG. 8 depicts a cross-sectional view of an operating mechanism for locking or unlocking the device using a split clamp.

FIG. 8 depicts an embodiment of upper stem 214, rotatable stem 206, and stem hub 208 where the operating mechanism for moving upper stem 214 into the locked or unlocked position includes clamp 236. Fasteners 242 may be rotated to loosen or tighten clamp 236. Rotating fasteners 242 to tighten clamp 236 causes cam surfaces of the clamp to engage shoulders of stem hub 208 and upper stem 214 so that the upper stem presses metal seal 216 against the stem hub to inhibit rotation of upper stem 214. Rotating fasteners 242 to loosen clamp 236 allows upper stem 214 to be moved away from metal seal 216 so that the upper stem may be used to rotate rotatable stem 206

Figure 9:
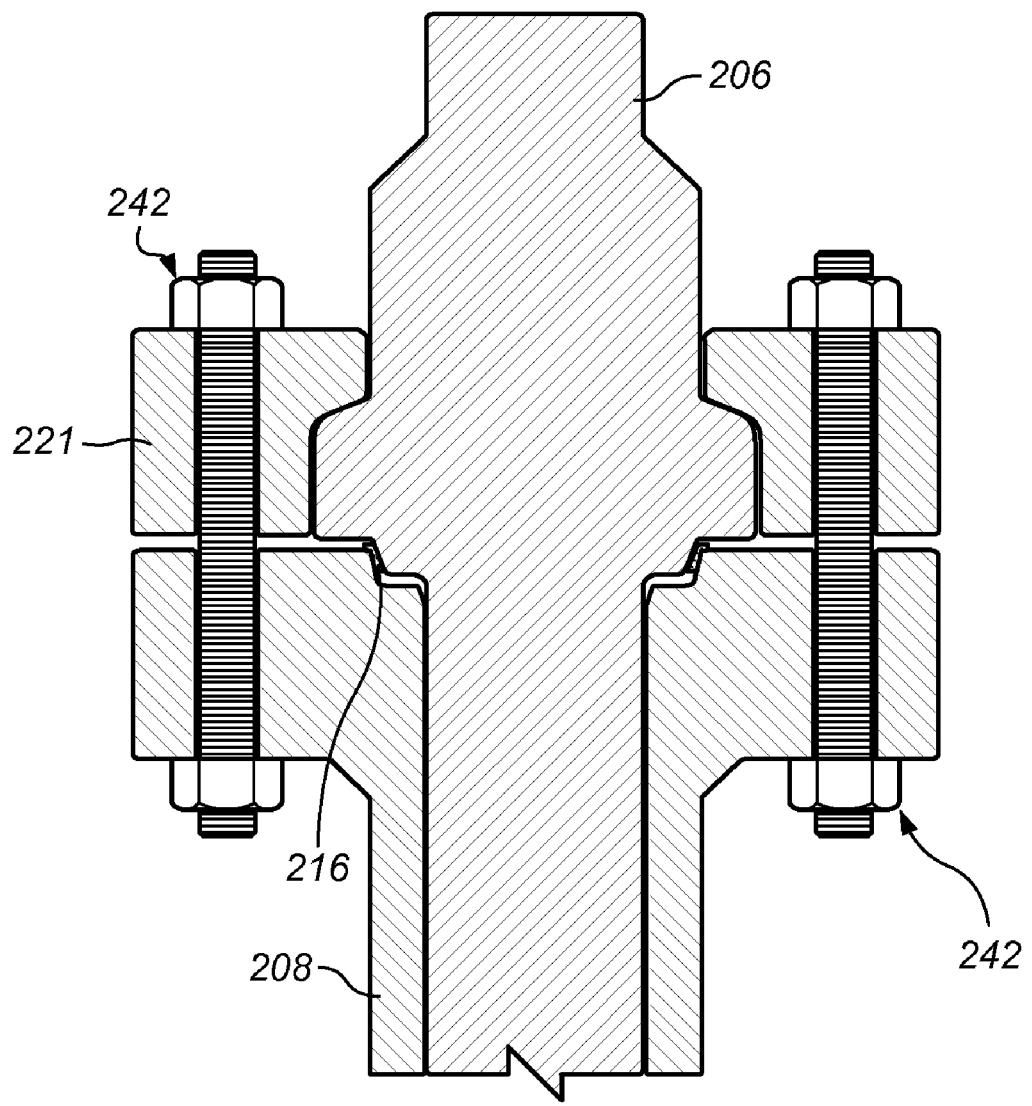
FIG. 9 depicts a cross-sectional view of an operating mechanism for locking or unlocking the device using a unitary upper stem and rotatable stem.

FIG. 9 depicts an embodiment of rotatable stem 206 and stem hub 208 with an operating mechanism for moving the rotatable stem into a locked or unlocked position. Instead of having an upper stem and a separate lower rotatable stem, rotatable stem 206 may be a single unit with an upper portion complementary to a drive tool used to rotate the rotatable stem. The lower portion of rotatable stem 206 engages the blocking element of the fitting in a manner able to transmit rotating torque while also being able to slide in a direction parallel to the rotational axis to accommodate locking or unlocking of the device.

Fasteners 242 may couple clamp 221 to stem hub 208. A portion of clamp 221 may engage a flared portion of rotatable stem 206. In the unlocked position, rotatable stem 206 is able to rotate relative to clamp 221. Fasteners 242 may be tightened to move rotatable stem 206 to the locked position. When fasteners 242 are tightened, clamp 221 engages the flared portion of rotatable stem 206, and the rotatable stem is moved downwards. A portion of rotatable stem 206 presses metal seal 216 against stem hub 208 so that rotation of the rotatable stem relative to the stem hub and clamp 221 is inhibited. Loosening fasteners 242 allows rotatable stem to be moved upwards so that the rotatable stem is allowed to turn relative to stem hub 208.

In some embodiments, the operating mechanism is coupled to commonly available hydraulic or pneumatic actuators for umbilical connected, remote operation by application of bidirectional fluid pressure. In some embodiments, the actuator is operated by a control panel mounted on an offshore platform or in the control room of a plant or refinery or at another location remote from the device.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a seal" includes a combination of two or more seals.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A device, comprising:
   a stem hub configured to be attached to a fitting body;
   a rotatable stem located at least partially within the stem hub, wherein the rotatable stem is configured to rotate within the stem hub, and wherein the rotation of the rotatable stem operates a blocking element in the fitting body;
   an upper stem coupled to a first end portion of the rotatable stem such that rotation of the upper stem rotates the rotatable stem, wherein the upper stem moves between a locked position and an unlocked position in a direction parallel to the rotational axis of the rotatable stem and the upper stem, the upper stem moving towards the stem hub when moving to the locked position and away from the stem hub when moving to the unlocked position;
   a metal seal positioned between the upper stem and the stem hub, wherein the metal seal is engaged by the upper stem and the stem hub when the upper stem is moved into the locked position; and
   an operating mechanism comprising a clamp ring that engages the upper stem such that movement of the clamp ring in the direction parallel to the rotational axis of the rotatable stem and the upper stem moves the upper stem in said direction and between the locked position and the unlocked position;
   wherein rotation of the upper stem is inhibited in the locked position; and
   wherein the upper stem is allowed to rotate once the upper stem begins movement away from the locked position and towards the unlocked position, said movement comprising movement away from the stem hub and disengagement of the metal seal, and wherein rotation of the upper stem rotates the rotatable stem once said movement begins.

2. The device of claim 1, wherein the metal seal is configured to seal the first end portion of the rotatable stem inside the upper stem and the stem hub when the upper stem is in the locked position.

3. The device of claim 1, wherein the metal seal is located in a groove on the stem hub.

4. The device of claim 1, wherein the stem hub is configured to be attached to a flange of the fitting body.

5. The device of claim 1, wherein the stem hub is configured to be welded to the fitting body.

6. The device of claim 1, further comprising one or more rotating seals located in the stem hub and surrounding the rotatable stem.

7. The device of claim 1, wherein a second end portion of the rotatable stem is located in the fitting body.

8. The device of claim 7, further comprising one or more rotating seals located in the fitting body and surrounding the second end portion of the rotatable stem.

9. The device of claim 1, wherein the rotatable stem operates the blocking element using a gear system.

10. The device of claim 1, wherein the upper stem is inhibited from rotating or moving when in the locked position.

11. The device of claim 1, wherein the operating mechanism comprises a gear system coupled to the upper stem and an actuator.

12. The device of claim 1, further comprising an indicator, wherein the indicator indicates if the upper stem is in the locked or the unlocked position.

13. The device of claim 1, further comprising an indicator, wherein the indicator indicates if the fitting body is opened or closed.

14. The device of claim 1, wherein the upper stem is configured to be actuated using a remotely operated vehicle (ROV), a hydraulic or pneumatic actuator, or human operator.

15. The device of claim 1, wherein the operating mechanism is configured to be actuated using a remotely operated vehicle (ROV), a hydraulic or pneumatic actuator, or human operator.

16. The device of claim 1, wherein the device is configured to be used in subsea applications.

17. A device, comprising:
   a stem hub configured to be attached to a fitting body;
   a rotatable stem located at least partially within the stem hub, wherein the rotatable stem is configured to rotate within the stem hub, and wherein the rotation of the rotatable stem operates a blocking element located in the fitting body;
   an upper stem coupled to a first end portion of the rotatable stem such that rotation of the upper stem rotates the rotatable stem, wherein the upper stem moves between a locked position and an unlocked position in a direction parallel to the rotational axis of the rotatable stem and the upper stem, the upper stem moving towards the stem hub when moving to the locked position and away from the stem hub when moving to the unlocked position;
   a metal seal located on the stem hub, wherein the metal seal is engaged by the upper stem and the stem hub when the upper stem is moved towards the stem hub and into the locked position; and
   a clamp ring that engages the upper stem such that movement of the clamp ring in the direction parallel to the rotational axis of the rotatable stem and the upper stem moves the upper stem either towards the stem hub or away from the stem hub in said direction;
   wherein rotation of the upper stem is inhibited in the locked position; and
   wherein the upper stem is allowed to rotate once the upper stem begins movement away from the locked position and towards the unlocked position, said movement comprising movement away from the stem hub and disengagement of the metal seal, and wherein rotation of the upper stem rotates the rotatable stem once said movement begins.

18. A system for opening and closing a blocking element located in a fitting body, comprising:
   the blocking element located in the fitting body;
   a stem hub attached to the fitting body;
   a rotatable stem located at least partially within the stem hub, wherein the rotatable stem rotates within the stem hub, and wherein the rotation of the rotatable stem operates the blocking element in the fitting body;
   an upper stem coupled to a first end portion of the rotatable stem such that rotation of the upper stem rotates the rotatable stem, wherein the upper stem moves between a locked position and an unlocked position in a direction parallel to the rotational axis of the rotatable stem and the upper stem, the upper stem moving towards the stem hub when moving to the locked position and away from the stem hub when moving to the unlocked position;
   a metal seal positioned between the upper stem and the stem hub, wherein the metal seal is engaged by the stem hub and the upper stem when the upper stem is moved into the locked position, and wherein the metal seal is configured to seal the first end portion of the rotatable stem inside the upper stem and the stem hub when the upper stem is in the locked position; and
   an operating mechanism comprising a clamp ring that engages the upper stem such that movement of the clamp ring in the direction parallel to the rotational axis of the rotatable stem and the upper stem moves the upper stem in said direction and between the locked position and the unlocked position;
   wherein rotation of the upper stem is inhibited in the locked position; and
   wherein the upper stem is allowed to rotate once the upper stem begins movement away from the locked position and towards the unlocked position, said movement comprising movement away from the stem hub and disengagement of the metal seal, and wherein rotation of the upper stem rotates the rotatable stem once said movement begins.

19. A system for opening and closing a blocking element located in a fitting body, comprising:
   the blocking element located in the fitting body;
   a stem hub attached to the fitting body;
   a rotatable stem located within the stem hub, wherein the rotatable stem moves between a locked position and an unlocked position in a direction parallel to the rotational axis of the rotatable stem, the rotatable stem moving towards the blocking element when moving to the locked position and away from the blocking element when moving to the unlocked position, wherein the rotatable stem rotates within the stem hub when the rotatable stem is in the unlocked position, and wherein the rotation of the rotatable stem operates the blocking element in the fitting body in the unlocked position;
   a metal seal positioned between the rotatable stem and the stem hub, wherein the metal seal is engaged by the rotatable stem and the stem hub when the rotatable stem is moved into the locked position, and wherein the metal seal is configured to seal the rotatable stem and the stem hub when the rotatable stem is in the locked position; and
   an operating mechanism comprising a clamp ring that engages an upper portion of the rotatable stem such that movement of the clamp ring in the direction parallel to the rotational axis of the rotatable stem moves the rotatable stem in said direction and between the locked position and the unlocked position, and wherein a lower portion of the rotatable stem engages the blocking element in both the locked position and the unlocked position;
   wherein rotation of the rotatable stem is inhibited in the locked position; and
   wherein the rotatable stem is allowed to rotate once the rotatable stem begins movement away from the locked position and towards the unlocked position, said movement comprising movement away from the blocking element and disengagement of the metal seal.

20. The device of claim 1, further comprising one or more bearings located between the upper stem and the clamp ring, wherein the bearings inhibit up and down movement of the upper stem relative to the clamp ring.

21. The device of claim 1, wherein, in the unlocked position, the upper stem is allowed to rotate and rotation of the upper stem rotates the rotatable stem and the blocking element in the fitting body.

22. The device of claim 1, wherein, in the locked position, the upper stem is prevented from rotation, which prevents any rotation of the rotatable stem and prevents any movement of the blocking element in the fitting body.

* * * * *